(12) United States Patent
Reibold

(10) Patent No.: US 7,860,632 B2
(45) Date of Patent: Dec. 28, 2010

(54) METHOD FOR OPERATING A DRIVE TRAIN BY TREATING THE MOTOR CHARACTERISTIC BY MEANS OF PARALLEL EVALUATION AND PT1-FILTERING

(75) Inventor: Ekkehard Reibold, Lahr (DE)

(73) Assignee: Schaeffler Technologies GmbH & Co. KG, Herogenaurach (DE)

( * ) Notice: Subject to any disclaimer, the term of this patent is extended or adjusted under 35 U.S.C. 154(b) by 0 days.

(21) Appl. No.: 12/540,748

(22) Filed: Aug. 13, 2009

(65) Prior Publication Data

US 2009/0299589 A1    Dec. 3, 2009

Related U.S. Application Data

(60) Division of application No. 10/904,724, filed on Nov. 24, 2004, now Pat. No. 7,617,035, and a continuation of application No. PCT/DE03/01711, filed on May 26, 2003.

(30) Foreign Application Priority Data

May 27, 2002    (DE) ................ 102 23 463

(51) Int. Cl.
F16D 48/06    (2006.01)
G06F 7/00    (2006.01)
(52) U.S. Cl. ............... 701/54; 701/66; 701/67; 192/3.28
(58) Field of Classification Search ........... 701/54, 701/41, 67, 68, 66, 84, 90, 101; 192/3.28, 192/54.1, 56.1; 477/176, 14
See application file for complete search history.

(56) References Cited

U.S. PATENT DOCUMENTS

| 5,322,150 | A | * | 6/1994 | Schmidt-Brucken et al. ............... 477/176 |
| 5,875,679 | A | | 3/1999 | Salecker et al. |
| 6,023,648 | A | * | 2/2000 | Murasugi et al. ............... 701/68 |
| 6,740,002 | B1 | * | 5/2004 | Stridsberg ............... 477/14 |
| 2002/0134637 | A1 | * | 9/2002 | Salecker et al. ............ 192/54.1 |

FOREIGN PATENT DOCUMENTS

| DE | 19504847 | 9/1995 |
| DE | 19819780 | 11/1998 |
| DE | 19832939 | 3/1999 |
| DE | 10052472 | 5/2001 |
| FR | 2763108 | 11/1998 |
| FR | 2767884 | 3/1999 |
| FR | 2771470 | 5/1999 |
| GB | 2327995 | 2/1999 |

\* cited by examiner

*Primary Examiner*—Tan Q Nguyen
(74) *Attorney, Agent, or Firm*—Simpson & Simpson, PLLC

(57) ABSTRACT

At least one input signal is detected in a time slot, representing the temporal progression of at least one rotational value of the motor of a drive train section and/or the respective corresponding power thereof and is electronically treated and/or evaluated a plurality of times in a parallel manner and according to different characteristics. At least one comparison of the different treating and/or evaluation results of the same input signal is determined, whether the transmission behavior of the drive train or at least one predetermined drive train component is altered. A PT1 filtering, for example, is used for the treatment and/or evaluation.

7 Claims, 2 Drawing Sheets

METHOD FOR OPERATING A DRIVE TRAIN BY TREATING THE MOTOR CHARACTERISTIC BY MEANS OF PARALLEL EVALUATION AND PT1-FILTERING

CROSS REFERENCE TO RELATED APPLICATIONS

This application is a divisional application claiming priority to U.S. patent application Ser. No. 10/904,724 filed Nov. 24, 2004, U.S. Pat. No. 7,617,035 which was filed under 35 U.S.C. §120 and §365(c) as a continuation of International Patent Application PCT/DE03/01711, filed May 26, 2003, which application claims priority of German Patent Application 102 23 463.9, filed May 27, 2002, which applications are incorporated herein by reference.

FIELD OF THE INVENTION

The invention relates to a method for operating and/or controlling a vehicle drive train and/or at least one of its components, a method for operating a friction clutch device, and an electronically controlled clutch device.

BACKGROUND OF THE INVENTION

Methods for operating and/or controlling a drive train of a motor vehicle and/or its components, methods for operating a friction clutch device and electronically controlled clutch devices are already known.

OBJECTS OF THE INVENTION

The object of the present invention is to provide a method for operating and/or controlling a motor vehicle drive train or at least its components that is reliable, a method for operating a friction clutch device that is reliable and an electronically controlled clutch device that is reliable.

This objective is achieved via a method for operating and/or controlling a motor vehicle drive train and/or at least one of its components, this drive train being coupled at the drive end to an internal combustion engine, a clutch device and a transmission device being disposed within this drive train and wheels being disposed at the driven end of the drive train in such a manner that they are able to be driven by the internal combustion engine via the drive train, wherein, at least one input signal, which is the temporal progression of at least one rotational parameter of the engine of a drive train section and/or the corresponding output at that time, is detected in a time slot and is electronically conditioned and/or evaluated a plurality of times in a parallel manner and according to different characteristics, and at least one comparison of the different conditioning and/or evaluation results of the same input signal is used to determine whether the transmission behavior of the drive train or at least one predetermined drive train component changes. Furthermore, the objective is achieved by a method for operating a friction clutch device that is disposed within a drive train and can be loaded by a drive system, such as an internal combustion engine, wherein a determination is made and/or there is a monitoring of whether the torque response of the friction clutch device changes, and specifically due to heating and/or deformation of the friction clutch device. Furthermore, the objective is achieved via a clutch device that is electronically controlled via the inventive method.

BRIEF SUMMARY OF THE INVENTION

According to the present invention, a method is provided for operating and/or controlling a motor vehicle drive train and/or at least one component that is disposed within this drive train.

The drive train is coupled to an internal combustion engine at the drive end in such a manner that the engine may load the drive train. A clutch device and a transmission device are provided within the drive train.

The clutch device is preferably formed as a friction clutch device. Especially preferably, the clutch device is an electronically controlled clutch device. An electronically controlled clutch device of this type may be designed, for example, in such a manner as those that are offered by the applicant under the designation "electronic clutch management" (ECM). However, the clutch device may also be formed differently.

Basically, the transmission device may be formed in any way desired. A transmission device of this type may be designed, for example, as a continuously variable transmission. Purely for the sake of example, it should be mentioned that a transmission device of this type may be designed as a conventional manual shift transmission, an automatic transmission or as an automated-shift transmission (AST). Other transmission designs are also preferred.

Wheels are disposed at the driven end of the drive train in such a manner that they may be driven by the internal combustion engine via the drive train.

According to the invention, provision is made that an input signal is determined or detected and conditioned and/or evaluated a plurality of times according to different characteristics, and specifically in a parallel manner. This should be understood to mean that the same input signal is conditioned and/or evaluated according to different characteristics. The parallelism may be such that the conditioning or evaluation runs simultaneously, at overlapping intervals or staggered in time.

It may also be provided that the same input signal may be conditioned and/or evaluated in a parallel manner according to different characteristics and these different evaluation results are conditioned together, and that a conditioning or evaluation of the same original input signal is carried out parallel to this entire process, that is, the manifold (parallel) conditioning and/or evaluation of the same input signal with subsequent (in series) conditioning and/or evaluation of the results.

The results in each case may—preferably—be conditioned and/or evaluated and/or compared to each other.

The input signal is in particular the temporal progression of a rotational parameter of the engine and/or at least one drive train section. A rotational parameter in the sense of the present invention is a torque, a speed or the time derivative of a torque or of a speed. An input signal may also be the output assigned to such a rotational parameter or corresponding to such a rotational parameter or the output of a component to which the pertinent rotational parameter is assigned.

According to the invention, it is provided in particular that, via at least one comparison of different conditioning and/or evaluation results of the same input signal, a determination is made of whether the transmission behavior of the drive train or of at least one component of such a drive train has changed.

In a preferred embodiment, such a component is a clutch device, and in particular a friction clutch device. For example, it may be provided that a determination is made according to the method of the invention, without the invention having to be limited thereby, of whether the torque that is transmissible by such a clutch device changes over time at the same (shift) position of this clutch device.

There may in particular be a comparison in a difference formation.

In a preferred embodiment of the invention, comparative results or differences of this type may in turn be conditioned and/or evaluated or compared to other conditioning and/or evaluation and/or comparison results.

In a preferred embodiment, it is provided that at least one PT1-filtering is used for the conditioning and/or evaluation, and the input signal and/or an evaluation or conditioning or comparison result is subjected to a PT1-filtering.

For the sake of simplicity, one speaks of "conditioning", an "evaluation" or a comparison also being possible instead of, or in addition thereto.

A plurality of, in particular, parallel or partially parallel "conditioning chains" or "conditioning branches" may be provided, it being provided in particular that the same input signal is supplied originally or at the beginning of each such "branch" or each such "chain".

Preferably, at least one (unaltered) input signal is supplied to a comparison. This may in particular be such that an input signal is conditioned, for example, via a PT1-filtering, and the result of this conditioning is compared to the same input signal that was not altered within the context of a (parallel) conditioning.

It may also be provided that the same input signal is first conditioned in an essentially parallel manner in different conditioning steps, the results of each are compared, and the end result is compared to the (unaltered) same input signal.

In a preferred embodiment, a PT1-filtering is used at least twice within the context of the conditioning, these PT1-filterings being distinguished by their time constants. In this case it is provided that the same input is supplied to the one of these PT1-filterings and to the other of these PT1-filterings in a parallel manner. "Parallel" in this connection does not mean that the result of one PT1-filtering is fed to another PT1-filtering, rather, that an identical signal is supplied to each of these PT1-filterings or that these PT1-filterings are carried out in different "conditioning branches".

In another preferred embodiment, the result of such a PT1-filtering is compared to an original input signal or to the result of a PT1-filtering having different time constants. It is also preferable that the result of such a comparison be supplied in turn to a PT1-filtering or compared to a different result (of a PT1-filtering or an (original) input signal).

Preferably, it is provided that at least two time constants of a PT1-filtering differ by a factor of "2". It is also preferable that two time constants of a PT1-filtering differ by a factor of "3" or at least by a factor of "5" or at least by a factor of "10". Other factors are also preferable.

In particular it may be provided that a PT1-filtering has the time constant 100 milliseconds (ms)", another PT1-filtering has the time constant "500 ms" and another PT1-filtering has the time constant "5 ms". The invention is not to be limited by these exemplary values.

In a preferred embodiment, at least one result of a comparison is again electronically conditioned and/or evaluated and/or compared to an evaluation result and/or conditioning result and/or comparison result within the context of the determination of whether the transmission behavior of the drive train or of a drive train component has changed.

According to the invention, a method for operating a friction clutch in particular is provided that is disposed within a drive train. The drive train can be loaded by a drive device, such as an internal combustion engine. Within the context of the method, there is a determination or a monitoring of whether the torque response of the friction clutch device changes and in particular due to heating and/or deformation of the friction clutch device.

For example, it may be provided that clutch deformations, which are attributable to the long-term creep of the friction clutch device, are determined via the methods of the invention without the invention being limited thereby. Such clutch deformations may be, for example, deformations of a clutch pressure plate or a clutch flywheel or the like without invention being limited thereby.

A long-term creep of this type may be present, for example—but again the invention must not be limited thereby—if the motor vehicle or the clutch device is operated in creep mode and a movement of the motor vehicle is hindered, for example, by a curb, an incline or another hindrance. This hindrance may be attributable in particular to the fact that the torque that is transmissible by the clutch device in creep mode is small, whereupon the clutch device slips.

Preferably, the determination and monitoring of such changes of the torque response of the clutch device is carried out as a function of at least one performance parameter of a motor vehicle, in which the drive train or the friction clutch device is disposed or can be disposed.

It is also preferable that, for determination and/or monitoring, the engine torque of an internal combustion engine that loads the drive train or its time derivative is evaluated.

This engine torque may, for example, be calculated, without the invention having to be limited thereby, and loaded via a CAN data bus.

It is also preferable that, for the transfer and/or monitoring of changes of the torque response of the friction clutch device, the crankshaft torque or the time derivative of the crankshaft torque of a crankshaft that is drivable or driven by an internal combustion engine is evaluated or conditioned.

In a preferred embodiment, a multi-timescale-analysis is carried out for the determination and/or monitoring of changes of the torque response of the friction clutch device. A multi-timescale-analysis may in particular be such that, using an appropriate mathematical function, a time signal $x(t)$ is observed on different time scales $t_1$, that is, for example, functions $F(x(t), 0), F(x(t), t_1), F(x(t), t_2), \ldots$.

In a preferred embodiment, it is provided that the results may be separated from each other on different time scales via such a timescale analysis.

Especially preferably, it is provided that, via such timescale analyses, long-term changes of the engine torque are determined and/or may be separated from short-term changes that are attributable, for example, to the operation of consumers, such as air conditioning systems or power steering or the like.

Preferably it is provided that, for the determination and/or monitoring of changes of the torque response of the friction clutch device, different functions of the engine torque signal are used and/or monitored and/or evaluated and/or compared.

It is also preferred that, for the determination and/or monitoring of changes of the torque response, at least one PT1-filtering is carried out.

Preferably, the engine speed is kept constant or is constant during the determination and/or monitoring of the changes of the torque response of the friction clutch device.

Preferably, the method is started or carried out if the clutch device slips, and in particular is operated in creeping mode, and especially when the internal combustion engine is running. A creeping mode in this context is in particular a mode of the clutch device in which it is able to transmit a low torque.

Such a creeping mode may in particular be provided and electronically controlled, for example, for parking and the like.

It is also preferable that the method is started and carried out if one of the wheel speeds or predetermined wheel speeds or all wheel speeds are equal to zero or are zero for at least a predetermined period of time.

In a preferred embodiment, an inventive method is carried out and then the clutch device is controlled with respect to the change of the transmission behavior of the clutch device according to the results.

Preferably, at least one outflow of the engine power, which flows to a consumer disposed in particular outside the drive train, is taken into consideration in the result. Such a consumer may, for example, be an air conditioning system, power steering or another consumer, without the invention being limited thereby.

The electronically controlled clutch device has frictional elements as well as a positioning mechanism and an electronic controller. The electronic controller can control the positioning mechanism and the positioning mechanism can adjust the frictional elements in relation to each other as a function of the control signals, so that the torque that is transmissible by the electronically controlled clutch device may be varied. According to the invention, it is provided in particular that the electronic controller also controls a method according to the invention.

The positioning mechanism may have, for example, electric motors that are controlled by the electronic controller.

The term "control" in the sense of the present invention is to be understood as "regulate" and/or "to control" in accordance with the DIN standards. The same is true for the terms derived from the term "control".

In the following, several exemplary or preferred aspects of the embodiments according to the invention are now explained with reference to the figures; however the invention is not to be limited thereby.

DETAILED DESCRIPTION OF THE INVENTION

Figure 1:
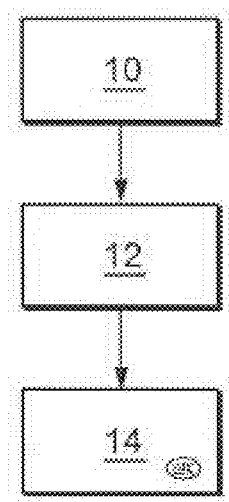
FIG. 1 shows the steps of an exemplary method according to the invention in a diagrammatic illustration.

FIG. 1 shows the steps of an exemplary method according to the invention in a diagrammatic illustration.

In step 10 at least one input signal is detected. This input signal may be, for example, the time characteristic of a rotational parameter of an engine of a motor vehicle and/or a rotational parameter of a drive train section of a motor vehicle and/or an output corresponding to each.

In step 12 a conditioning or evaluation of the input signal is initiated or carried out.

The evaluation and/or conditioning is in particular such that the input signal is conditioned or evaluated a plurality of times, and in particular is evaluated and conditioned in a parallel manner such that the same input signal is supplied to an evaluation or conditioning a plurality of times (in a parallel manner).

In step 14 the method is terminated.

Figure 2:
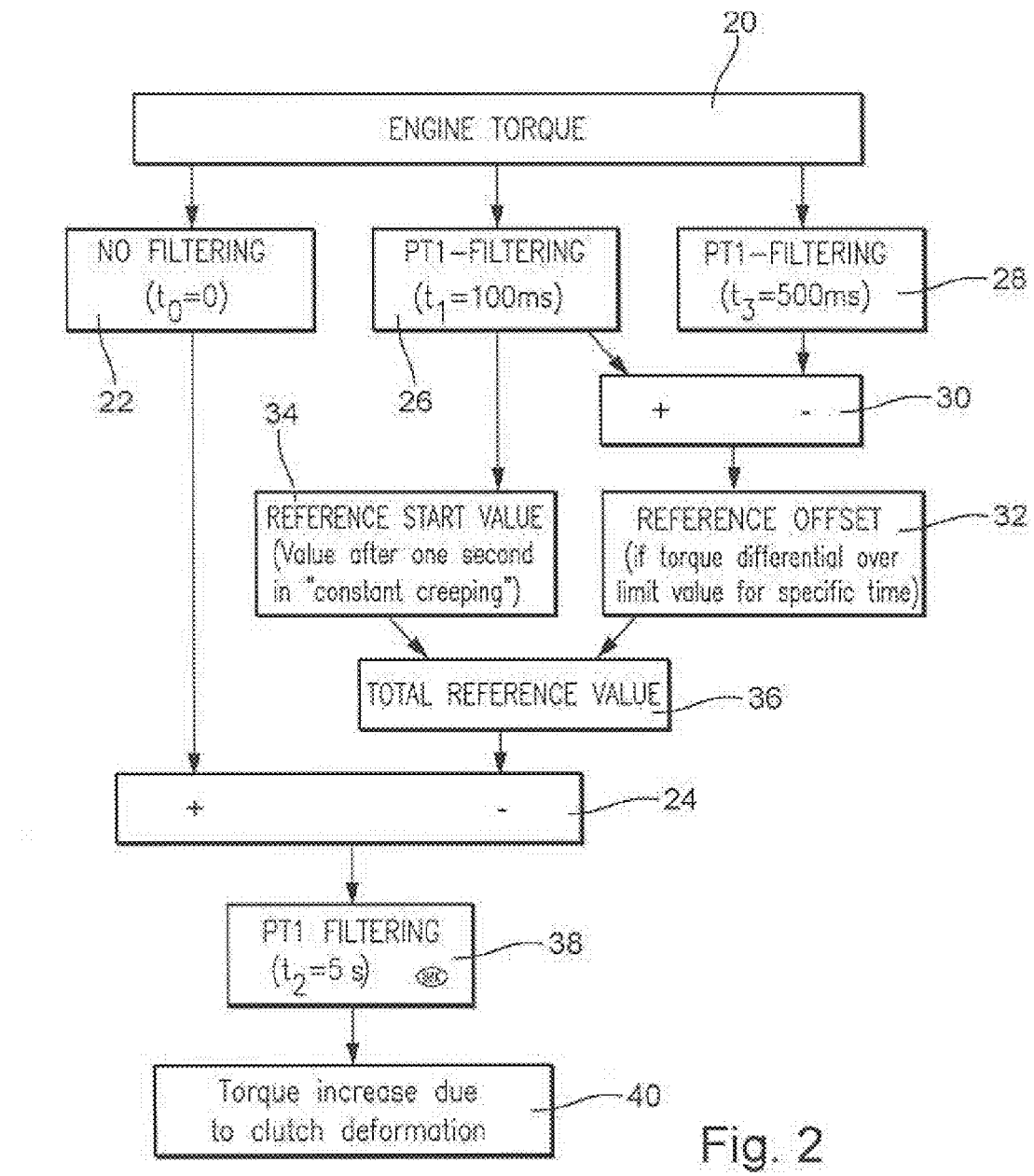
FIG. 2 shows the steps of an exemplary method according to the invention in a diagrammatic illustration; and, FIG. 3 shows exemplary torque-time-curves that may exist in the operation of a motor vehicle.

FIG. 2 shows the steps of an exemplary inventive method in diagrammatic illustration.

In step 20 the engine torque or the characteristic of the engine torque is supplied.

This same input signal or this engine torque signal is conditioned or evaluated according to different characteristics, and specifically in this case via a multi-scale-time analysis, as is shown below.

In step 22, the engine torque signal provided in step 20 is supplied unfiltered or with the time constant t=0 for a comparison in step 24.

Essentially parallel to this, the engine torque signal provided in step 20 is subjected to a PT1-filtering and specifically in the example here with a time constant of $t_1=100$ ms.

Likewise, essentially parallel to this, in step 28 the engine torque signal provided in step 20 is also subjected to a PT1-filtering whose time constant, however, deviates from the PT1-filtering in step 26 and in this case $t_3=500$ ms.

Additional, parallel PT1-filterings can also be provided to which the input signal (engine torque signal) provided in step 20 is supplied and which are not depicted in FIG. 2.

In step 30 the evaluation results of the PT1-filterings according to steps 26 and step 28 are compared to each other, and specifically in that the difference between the results of these PT1-filterings is formed.

The result of this difference formation is prepared in step 32 as a reference offset.

It should be noted that, in the difference formation in step 30, the result of the PT1-filtering with greater time constants is deducted from the result of the PT1-filtering with smaller time constants.

In step 34 a reference start value is provided, this reference start value corresponding in this case to result of the PT1-filtering that was carried out in step 26. The reference start value is therefore the result of the PT 1-filtering with lower time constants that is supplied to the comparison in step 30.

In step 36 a total reference value is determined from the reference start value and the reference offset. For this purpose, the reference offset is added to the reference start value.

The result or the total reference value is provided for the comparison according to step 24.

The comparison carried out in step 24 in this case is a difference formation. In this context, the total reference value is deducted from the unfiltered or original or unchanged engine torque signal.

The deviation given here is attributable to a clutch deformation.

The result of the difference formation according to step 24 is subjected anew to a PT1-filtering, which is carried out in step 38 and in this case has a time constant of $t_2=5$ seconds.

In step 40 the engine torque increase, which is attributable to a clutch deformation, is supplied as a result.

Figure 3:
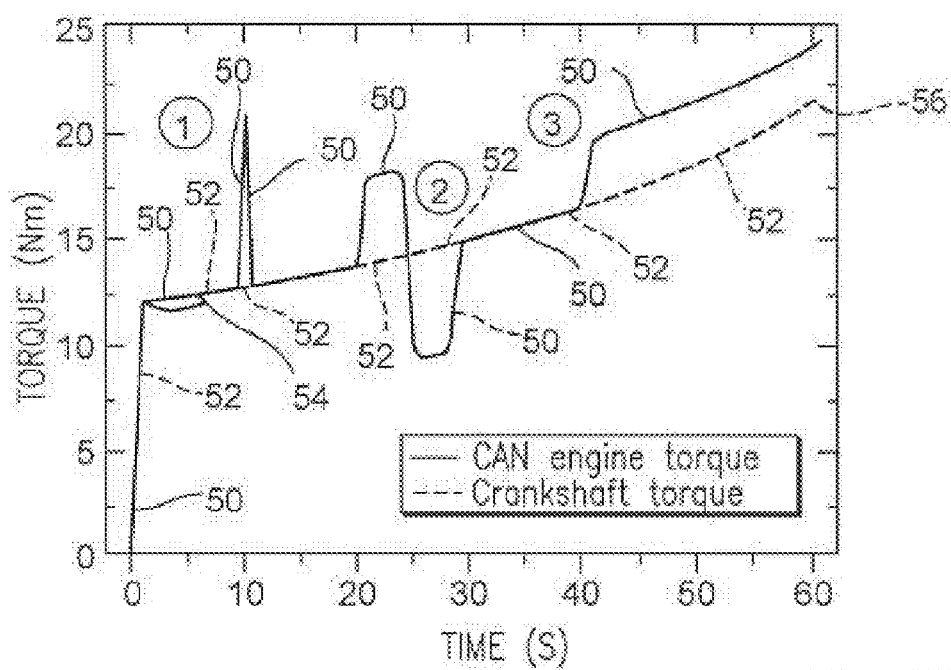

FIG. 3 shows exemplary torque-time-characteristics, which may be present during the operation of a motor vehicle.

Represented in FIG. 3 in particular are an engine torque 50 supplied via a CAN data bus and a crankshaft torque 52.

When creeping with a slipping clutch and a stationary engine speed, the transmitted clutch torque essentially corresponds to the crankshaft torque 52.

The engine torque 50, which is represented FIG. 3, is a calculated engine torque.

The engine torque 50, as is discernable from FIG. 3, corresponds essentially to the crankshaft torque 52.

However, if additional consumers, such as air conditioners or power steering or the like, are added in, the engine torque supplied via CAN data bus changes for a short time, as may be recognized in areas 1, 2 and 3 in FIG. 3 (numbers circled), but not the crankshaft torque 52.

In order to eliminate, for example, such short-term influences and to detect or determine just the longer-term increase of the crankshaft torque 52 or the engine torque 50, the method of the invention may likewise be carried out.

The continuous increase of the torque, which is illustrated in its endpoints by reference characters 54 and 56, is attributable in this case to a clutch deformation and/or clutch heating.

This influence may be determined via a method of the invention.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or divisional applications. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A method for operating and controlling a motor vehicle drive train and at least one of its components, said drive train being coupled at a drive end to an internal combustion engine, a clutch device and a transmission device being disposed within said drive train and wheels being disposed at a driven end of the drive train in such a manner that said wheels are operatively arranged to be driven by the internal combustion engine via the drive train, comprising the steps of:

detecting at least one input signal in a time slot, which comprises a temporal progression of at least one rotational parameter of a drive train section and a corresponding output;

electronically conditioning and evaluating said at least one input signal a plurality of times in a parallel manner and according to different characteristics; and, using at least one comparison of the conditioning and evaluation results of at least one input signal to determine whether transmission behavior of the drive train or at least one pre-determined drive train component changes.

2. The method as described in claim 1, wherein at least one PT1-filtering is used for the conditioning and evaluation.

3. The method as described in claim 1, wherein the conditioning and evaluation according to at least one characteristic is such that an unaltered input signal is provided for a comparison.

4. The method as described in claim 1, wherein at least two PT1-filterings, that are distinguished by their time constants, are carried out within the context of the conditioning and evaluation, and the same input signal is supplied, especially in a parallel manner, on the one hand to the one PT1-filtering and on the other hand to the other PT1-filtering.

5. The method as described in claim 4, wherein the time constants of two PT1-filterings differ by at least a factor of "two".

6. The method as described in claim 1, wherein at least one result of a comparison within the context of the determination of whether the transmission behavior of the drive train or of a drive train component has changed is again electronically conditioned and evaluated and compared to and evaluation and conditioning and comparison result.

7. An electronically controlled friction clutch device comprising frictional elements, a positioning mechanism and an electronic controller, the electronic controller operatively arranged to control the positioning mechanism, and this positioning mechanism operatively arranged to adjust the frictional elements in relation to each other as a function of the corresponding control signals in such a manner that the torque transmissible by the electronically controlled clutch device may be varied, and the controller controlling a method of:

detecting at least one input signal in a time slot, which comprises a temporal progression of at least one rotational parameter of a drive train section and a corresponding output;

electronically conditioning and evaluating said at least one input signal a plurality of times in a parallel manner and according to different characteristics; and, using at least one comparison of the conditioning and evaluation results of at least one input signal to determine whether transmission behavior of the drive train or at least one pre-determined drive train component changes.

* * * * *